United States Patent [19]
Glover

[11] Patent Number: 6,108,153
[45] Date of Patent: Aug. 22, 2000

[54] SERVO DEMODULATOR AND METHOD FOR SYNCHRONOUS SERVO DEMODULATION

[75] Inventor: Kerry C. Glover, Wylie, Tex.

[73] Assignee: Texas Instruments Incorporated, Dallas, Tex.

[21] Appl. No.: 08/924,739

[22] Filed: Sep. 5, 1997

Related U.S. Application Data

[60] Provisional application No. 60/024,720, Sep. 9, 1996.
[51] Int. Cl.$^7$ ................................ G11B 5/09; G11B 5/596
[52] U.S. Cl. ............................................. 360/51; 360/77.08
[58] Field of Search ......................... 360/51, 46, 78.01, 360/78.04, 78.08, 78.14, 77.08

[56] References Cited

U.S. PATENT DOCUMENTS

| | | | |
|---|---|---|---|
| 5,341,249 | 8/1994 | Abbott et al. | 360/46 |
| 5,552,942 | 9/1996 | Ziperovich et al. | 360/51 |
| 5,576,904 | 11/1996 | Behrens | 360/51 |
| 5,576,906 | 11/1996 | Fisher et al. | 360/77.08 |
| 5,796,535 | 8/1998 | Tuttle et al. | 360/51 |
| 5,805,001 | 9/1998 | Sheahan et al. | 327/142 |

OTHER PUBLICATIONS

"A Class Of Partial Response Systems For Increasing Storage Density In Magnetic Recording", Thapar, et al., *IEEE Transactions on Magnetics*, vol. Mag–23, No. 5, Sep. 1987, pp. 3666–3668.

"A (D.K.C.)=(0.3,5/2) Rate R/10 Modulation Code*", Fredrickson, Lyly J., *IEEE*, '90, pp. 2328–2320.

"A Generalized Scheme For Generating and Detecting Recording Channel Output Waveforms With Controlled Pulse Polarity", French, et al., *IEEE Transactions on Magnetics*, vol. 24, No. 6, Nov. 1988, pp. 2530–2532.

"A Maximum Likelihood Detector For NonLinear Magnetic Recording", Fitzpatric, et al., *IEEE Transactions On Magnetics*, vol. 27, No. 6, Nov. 1991, pp. 4816–4818.

"A Maximum Likelihood Peak Detecting Channel", Chopra et al., *IEEE Transactions On Magnetics*, vol. 27, No. 6, Nov. 1991, pp. 4819–4821.

"A New Digital Signal Processing Channel For Data Storage Products", Patel, *IEEE Transactions On Magnetics*, vol. 27, No. 6, Nov. 1991, pp. 4579–4584.

"A New Runlength Limited Code For Binary Asymmetric Channels", Menyennett, et al., *IEEE*, 1992, 2 sheets.

"A Post–Compensation Scheme For Peak–Detect Channel", Sutardja, *IEEE Transactions on Magnetics*, vol. 26, No. 5, Sep. 1990, pp. 2303–2305.

(List continued on next page.)

*Primary Examiner*—W. Chris Kim
*Attorney, Agent, or Firm*—W. Daniel Swayze, Jr.; W. James Brady, III; Frederick J. Telecky, Jr.

[57] ABSTRACT

A servo demodulator (20) is provided for generating a track identification signal (148) and a position error signal (150) from a servo wedge signal, such as a filtered servo wedge signal (112), in response to the processing of the servo wedge signal by a read channel (18). The servo demodulator (20) includes a servo clock generation circuit (90), a position error signal circuit (92), and a track identification circuit (76). The servo clock generation circuit (90) generates a synchronous servo clock signal (102) in response to receiving a servo reference clock signal (110) and the filtered servo wedge signal (112). The synchronous servo clock signal (102) is provided to the read channel (18) for use in processing the servo wedge signal. The position error signal circuit (92) generates the position error signal (150) in response to receiving the synchronous servo clock signal (102) from the servo clock generation circuit (90) and a synchronously sampled servo wedge signal (114) from the read channel (18). The read channel (18) generates the synchronously sampled servo wedge signal (114) by using the synchronous servo clock signal (102) to synchronously sample the servo wedge signal. The track identification circuit (76) generates the track identification signal (148) in response to receiving a digital servo wedge signal (116) from the read channel (18).

20 Claims, 5 Drawing Sheets

OTHER PUBLICATIONS

"A PRML System For digital Magnetic Recording", Cideciyan, et al., *IEEE Journal On Selected Areas In Communications,* vol. 10, No. 1,, Jan. 1992, pp. 38–56.

"A Simple Statistical Model Of Partial Erasure In Thin Film Disk Recording Systems", Barndt, et al., *IEEE Transactions On Magnetics,* vol. 27, No. 6, Nov. 1991, pp. 4978–4980.

"A Simulation Study Of Adaptive Reception Schemes For High–Density Digital Magnetic Storage", Bergmans, et al., *IEEE Transactions On Magnetics,* vol. 27, No. 1, Jan. 1991, pp. 717–723.

"A Survey Of Codes For Partial Response Channels", Wolf, *IEEE Transactions On Magnets,* vol. 27, No. 6, Nov. 1991, pp. 4585–4589.

"A Technique For Measuring Nonlinear Bit Shift", Tang, et al., *IEEE Transactions On Magnetics,* vol. 27, No. 6, Nov. 1991, pp. 5316–5318.

"ACT–enabled 100MHz Channel Equalizer", Kumar, et al., *IEEE Transactions On Magnetics,* vol. 27, No. 6, Nov. 1991, pp. 4799–4803.

"Adaptive Maximum–Likelihood Receiver for Carrier–odulated Data–Transmission Systems", *IEEE Transactions On Communications,* vol. Com–22, No. 5, May 1974, pp. 624–636.

"An Estimation Technique For Accurately Modeling The Magnetic Recording Channel Including Nonlinerarities", *IEEE Transactions On Magnetics,* vol. 25, No. 5, Sep. 1989, pp. 4084–4086.

"An Experimental 180 Mb/sec PRML Channel for Magnetic Recording", Hong, et al., *IEEE Transactions On Magnetics,* vol. 27, No. 6, Nov. 1991, pp. 4532–4537.

"Analysis Of Asymmetric Deterministic Bitshift Errors In A Hard Disk File", Nunnelley, et al., *IEEE Transactions On Magnetics,* vol. 26, No. 5, Nov. 1990, pp. 2306–2308.

"Application Of Partial–Response Channel Coding To Magnetic Recording Systems", Kobayashi, et al., *IBM J. Res. Develop.,* Jul. 1970,pp. 368–375.

"Characterization Of Digital Recording Channels By Means Of Echo Cancellation Techniques", Bergmans, et al., *IEEE Transactions On Magnetics,* col. 25, No. 5, Sep. 1989, pp. 4078–4080.

"Coding For Maximum Likelihood Detection On A Magnetic Recording Channel", Fredrickson, *IEEE Transactions On Magnetics,* vol. 26, No. 5, Sep. 1990, pp. 2315–2317.

"Combined ECC/RLL Codes*", Lin, et al., *IEEE Transactions On Magnetics,* vol. 24, No. 6, Nov. 1988, pp. 2527–2529.

"Comparative Performance Between Drop–Out Detection and Viterbi Reliability Metric Erasure Flagging", Ryan, *IEEE Transactions On Magnetics,* vol. 28, No. 5, Sep. 1992, pp. 2898–2900.

"Comparison of Computationally Efficient Forms Of FDTS/DF Against PR4–ML", Carley, et al., *IEEE Transactions On Magnetics,* vol. 27, No. 6, Nov. 1991, pp. 4567–4572.

"Considerations For High Date Rate Recording With Thin–Film Heads", Wood, et al., *IEEE Transactions On Magnetics,* vol. 26, No. 5, Nov. 1990, pp. 2954–2959.

"Contributions To The Application Of The Viterbi Algorithm", Burkhardt, et al.,*IEEE Transactions On Information Theory,* vol. IT–31, No. 5, Sep. 1985, pp. 626–634.

"Discrete–Time Modeling of Transition–Noise Dominant Channels and Study of Detection Performance", Moon, *IEEE.*

"Distance Preserving Run–Length Limited Codes", French, *IEEE Transactions On Magnetics,* vol. 25, No. 5, Sep. 1989, pp. 4093–4095.

"Enhanced Decision Feedback Equalization", Wood, *IEEE Transactions On Magnetics,* vol. 26, Sep. 1990, No. 5, Sep. 1990, pp. 2303–2305.

"Error Detecting Multiple Block (d.k.) Codes", Fredrickson, et al., *IEEE Transactions On Magnetics,* vol. 25, No. 5, Sep. 1989, pp. 4096–4098.

"Error Rate Performance Of Experimental Gigabit Per Square Inch Recording Components", Howell, et al., *IEEE Transactions On Magnetics,* vol. 26, No. 5, Sep. 1990, pp. 2298–2302.

"Experimental Studies Of Nonlinearities In High Density Disk Recording", Lin, et al., *IEEE Transactions On Magnetics,* vol. 28, No. 5, Sep. 1992, pp. 3279–3281.

"Evaluation Of Magnetic Recording Detection Schemes For Thin Film Media", Kenney, et al. *IEEE Transactions On Magnetics,* vol. 27, No. 6, Nov. 1991, pp. 4822–4824.

"Identification Of Nonlinear Write Effects Using Pseudorandom Sequences", Palmer, et al., *IEEE Transactions On Magnetics,* vol. Mag–23, No. 5, Sep. 1987, pp. 2377–2379.

"Implementation of PRML In A Rigid Disk Drive", Coker, et al., *IEEE Transactions On Magnetics,* vol. 27, No. 6, Nov. 1991, pp. 4538–4543.

"Jitter Vs. Additive Noise In Magnetic Recording Effects On Detection", Wood, *IEEE Transactions On Magnetics,* vol. Mag–23, No. 5, Sep. 1987, pp. 2683–2685.

"Low–Complexity Viterbi Detection For A Family Of Partial Response Systems", Shafiee, et al, *IEEE Transactions On Magnetics,* vol. 28, No. 5, Sep. 1992, pp. 2892–2894.

"Magnetic Characterization Using Elements Of A PRML Channel", Coker, et al., *IEEE Transactions On Magnetics,* vol. 27, No. 6, Nov. 1991, pp. 4544–4548.

"Magnetic Recording Channel Front–Ends", Klaassen, *IEEE Transactions On Magnetics,* vol. 27, No. 6, Nov. 1991, pp. 4503–4508.

"Matched Filter Limits And Code Performance In Digital Magnetic Recording", Koren, *ITTT Transactions O Magnetics,* vol. 27, No. 6, Nov. 1991, pp. 4594–4599.

Maximum–Likelihood Sequence Estimation Of Digital Sequences In The Presence of Inter–symbol Interference, *IEEE Transactions On Information Theory,* vol. IT–18, No. 3, May 1972.

"Measurement Of Noise In Magnetic Media", Baugh, et al., *IEEE,* 1993, pp. 1722–1724.

"Media Design For User Density Of Up To 3 Bits Per Pulse Width", Simmons, et al., *IEEE Transactions On Magnetics,* vol. 29, No. 1, Jan. 1993, pp. 169–176.

"Media Design Considerations For A PRML Channel", Palmer, et al., *IEEE Transactions On Magnetics,* vol. 29, No. 1, Jan. 1993, pp. 189–194.

"Media Selection for High Density Recording Channels", Barndt, et al., *IEEE Transactions On Magnetics,* vol. 29, No. 1, Jan. 1993, pp. 183–188.

Modeling and Signal Processing For The Nonlinear Thin Film Recording Channel*, Barndt, et al., *IEEE Transactions On Magnetics,* vol. 28, No. 5, Sep. 1992, pp. 2710–2712.

"Modified Viterbi Algorithm For A Jitter–dominant $1-D^2$ Channel*", Zeng, et al., *IEEE Transactions On Magnetics,* vol. 28, No. 5, Sep. 1992, pp. 2895–8297.

"New Detector For 1.k Codes Equalized To Class II Partial Response", Woo, *IEEE Transactions On Magnetics,* vol. 25, No. 5, Sep. 1989, pp. 4075–4077.

"Noise Autocorrelation In High Density Recording On Metal Film Disks", Tang, *IEEE Transactions On Magnetics,* vol. Mag–22, No. 5, Sep. 1986, pp. 883–885.

"Noise Autocorrelation In Magnetic Recording Systems", Tang, *IEEE Transactions On Magnetics,* vol. Mag–21, No. 5, Sep. 1985, pp. 1389–1394.

"Noise In A Thin Metallic Medium: The Connection With Nonlinear Behaviour", Melas, et al *IEEE Transactions On Magnetics,* vol. 24, No. 6, Nov. 1988.

"Nonlinear Effects Of Transition Broadening", Moon et al.., *IEEE Transactions On Magnetics,* vol. 27, No. 6, Nov. 1991, pp. 4831–4833.

"Nonlinear Superposition In Saturation Recording Of Disk Media", Melas, et al., *IEEE Transactions On Magnetics,* vol. Mag–23, No. 5, Sep. 1987, pp. 2079–2081.

"Nonlinearities In Thin –film Media And Their Impact On Data Recovery", Moon, et al., *IEEE Transactions On Magnetics,* vol. 29, No. 1, Jan. 1993, pp. 177–182.

"On Feed–Forward And Feedback Timing Recovery For Digital Magnetic Recording System", Raghavan, et al., *IEEE Transactions On Magnetics,* vol. 27, No. 6, Nov. 1991, pp. 4810–4812.

"On The Performance Of A Rate 8/10 Matched Spectral Null Code For Class–4 Partial Response", Thapar, et al., *IEEE Transactions On Magnetics,* vol. 28, No. 5, Sep. 1992, pp. 2883–2888.

"Partial–Response Signaling", Kabal, et al., *IEEE Transactions On Communications,* vol. Com–23, No. 9, Sep. 1973, pp. 921–934.

"Partial Response Signaling In A Magnetic Recording Channel", Moon, et al., *IEEE Transactions On Magnetics,* vol. 24, No. 6, Nov. 1988, pp. 2973–2975.

"Performance Comparison of Detection Methods In Magnetic Recording", Moon, et al., *IEEE Transactions on Magnetics,* vol. 25, No. 6, Nov. 1990, pp. 3155–3172.

"Performance Degradation Of PRML Channels Due To Nonlinear Distortions", Ziperovich, *IEEE Transactions On Magnetics,* vol. 27, No. 6, Nov. 1991, pp. 4825–4827.

"Performance Evaluation Of A New Coding Scheme For The Peak Detecting Magnetic Recording Channel", Armstrong et al., *IEEE Transactions On Magnetics,* vol. 27, No. 6, Nov. 1991, pp. 4804–4806.

"Feed–Forward Timing Recovery For Digital Magnetic Recording*", Raghavan, et al., *IEEE Transactions On Magnetics,* 1991, pp. 0794–0797.

"Performance of Digital Magnetic Recording with Equalization And Offtrack Interference", Abbott, et al., *IEEE Transactions On Magnetics,* vol. 27, No. 1, Jan. 1991, pp. 705–716.

"Performance And Sensitivity Analysis Of Maximum–Likelihood Sequence Detection On Magnetic Recording Channels", Dollvo, et al., *IEEE Transactions On Magnetics,* vol. 25, No. 5, Sep. 1989, pp. 4072–4074.

"Results On 'Controlled Polarity' Modulation And Coding", Weathers, et al., *IEEE Transactions on Magnetics,* vol. 25, No. 5, Sep. 1989, pp. 4090–4092.

"Sequence (Viterbi–Equivalent) Decoding", Schneider, *IEEE Transactions On Magnetics,* vol. 24, No. 6, Nov. 1988, pp. 2539–5241.

"Shift Error Correcting Modulation Codes", Hilden, et al., *IEEE Transactions On Magnetics,* vol. 27, No. 6, Nov. 1991, pp. 4600–4605.

"Signal–to–Noise Ratio Degradation With Channel Mismatch", Moon, *IEEE Transactions On Magnetics,* vol. 27, No. 6, Nov. 1991, pp. 4837–4839.

"Spectral Shaping For Peak Detection Equalization", Thapar, et al., *IEEE Transactions On Magnetics,* vol. 26, No. 5, Sep. 1990, pp. 2309–2311.

"Statistical Detection For Communication Channels With Intersymbol Interference", Abend, et al., *Proceedings Of The IEEE,* vol. 58, No. 5, May 1970, pp. 779–785.

"The Choice Of The Desired Impulse Response in Combined Linear–Viterbi Algorithm Equalizers", Beare, *IEEE Transactions On Communications,* vol. Com–26, No. 8, Aug. 1978, pp. 1301–1307.

"The Viterbi Algorithm", Forney, Jr., *Proceedings of the IEEE,* vol. 61, No. 3, Mar. 1973, pp. 268–278.

"Time–Domain Study Of Proximity–Effect Induced Transition Shifts", Tsang, et al., *IEEE Transactions On Magnetics,* vol. 27, No. 2, Mar. 1991, pp. 795–802.

"Viterbi Detection Of Class IV Partial Response On A Magnetic Recording Channel", Wood, et al., *IEEE Transactions on Communications,* vol. Com–34, No. 5, May 1986, pp. 454–461.

"Viterbi Detection Of Matched Spectral Null Codes For PR4 Systems", Fredrickson, *IEEE Transactions On Magnetics,* vol. 28, No. 5, Sep. 1992, pp. 2889–2891.

"Volterra Modeling Of Digital Magnetic Saturation Recording Channels", Hermann, *IEEE Transactions On Magnetics,* vol. 26, No. 5, Sep. 1990, pp. 2125–2127.

Write Equalization For Generalized (d.k) codes, Schneider, *IEEE Transactions On Magnetics,* vol. 24, No. 6, Nov. 1988, pp. 2533–2535.

SERVO DEMODULATOR AND METHOD FOR SYNCHRONOUS SERVO DEMODULATION

This application claims priority under 35 U.S.C. § 119 (e)(1) of provisional application No. 60/024,720, filed Sept. 9, 1996.

TECHNICAL FIELD OF THE INVENTION

This invention relates generally to the field of information storage and more particularly to a servo demodulator and method for synchronous servo demodulation.

BACKGROUND OF THE INVENTION

As computer hardware and software technology continues to progress, the need for larger and faster mass storage devices for storing computer software and data continues to increase. Electronic databases and computer applications such as multimedia applications require large amounts of disk storage space.

To meet these ever increasing demands, the hard disk drive (HDD) continues to evolve and advance. Some of the early disk drives had a maximum storage capacity of five megabytes and used fourteen inch platters, whereas today's HDDs are commonly over one gigabyte and use 3.5 inch platters. Advances in the amount of data stored per unit of area, or areal density, have dramatically accelerated. For example, in the 1980's, areal density increased about thirty percent per year while in the 1990's annual areal density increases have been around sixty percent. Areal density may be increased by increasing the rate at which data may be stored and retrieved. The cost per megabyte of an HDD is inversely related to its areal density.

In general, mass storage devices and systems, such as HDDs, include a magnetic storage media, such as rotating disks or platters, a spindle motor, read/write heads, a servo actuator, servo circuitry, a pre-amplifier, a read channel, a write channel, a memory, and control circuitry to control the operation of the HDD and to properly interface the HDD to a host or system bus. The read channel, write channel, servo circuitry, and memory may all be implemented as one integrated circuit that is referred to as a data channel. The control circuitry often includes a microprocessor for executing control programs and processing information provided during the operation of the HDD.

An HDD performs write, read, and servo operations when storing and retrieving data. A typical HDD performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The read/write heads are moved to the appropriate track and sector. Finally, the HDD control circuitry transfers the data from the DRAM to the sector using the write channel. A sector generally has a fixed data storage capacity, such as 512 bytes of user data per sector. A write clock controls the timing of a write operation in the write channel. The write channel may encode the data so that the data can be more reliably retrieved later.

In a read operation, the appropriate sector to be read is located and data that has been previously written to the disk is read. A read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the read signal to an appropriate level using an automatic gain control circuit. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM. The processor then communicates to the host that data is ready to be transferred. A read clock controls the timing of a read operation in the read channel. The goal during a read operation is to accurately retrieve the data while minimizing the bit error date (BER) in the noisiest environment.

Recently, advanced techniques utilizing discrete time signal processing (DTSP) to reconstruct and read the original data written to the disk are being used in read channel electronics to improve areal density. In these techniques, the data is synchronously sampled using a data recovery clock. The sample is then processed through a series of mathematical manipulations using signal processing theory. There are several types of synchronously sampled read channels. Partial response, maximum likelihood (PRML); extended PRML (EPRML); enhanced, extended PRML (EEPRML); fixed delay tree search (FDTS); and decision feedback equalization (DFE) are several examples of different types of synchronously sampled read channels using DTSP techniques. The maximum likelihood detection performed in several of these systems is usually performed by a Viterbi decoder implementing the Viterbi algorithm, named after Andrew Viterbi who developed it in 1967.

In a servo operation, the servo circuitry generates a track identification signal and a position error signal (PES) by reading and demodulating a servo wedge stored on each sector. The PES indicates the relative alignment of the read/write head on a particular track so that the head may be properly positioned for both read and write operations. The servo wedge includes track identification information, for generating the track identification signal, and track misregistration or position error information, for generating the PES. The position error information may be provided as servo bursts. The track identification signal and PES are provided to the control circuitry during read and write operations so that a track may be identified by the track identification signal and the read/write heads may be properly aligned on the track using the PES.

Traditionally, servo circuitry includes peak detection circuitry that is used during a servo operation to assist with processing the servo wedge so that the track identification signal and PES may be generated. Problems arise when using peak detection circuitry that ultimately result in reduced overall HDD capacity, excess power consumption, and increased track rereads that harm overall HDD performance. The overall HDD capacity is reduced because the peak detection circuitry is relatively slow in processing the servo wedge and generating the corresponding track identification signal and PES. Because of this, a larger servo wedge, requiring additional HDD capacity, must be provided to the peak detection circuitry. This reduces the overall HDD capacity available for data/information storage. Power consumption is increased because of the additional circuitry needed to implement the peak detection circuitry. Power consumption is especially critical in portable or battery powered applications such as laptop or notebook computers. The additional circuitry may also increase overall fabrication costs. Peak detection circuitry may not be as accurate as desired resulting in track identification signal errors. Track identification signal errors result in track rereads which harm overall HDD performance.

SUMMARY OF THE INVENTION

From the foregoing it may be appreciated that a need has arisen for an improved servo circuitry for use during servo operations. In accordance with the present invention, a servo demodulator and method for synchronous servo demodulation are provided which substantially eliminate or reduce the disadvantages and problems of previously developed servo circuitry and methods using peak detection circuitry. The present invention includes a servo demodulator, working in combination with an existing synchronously sampled read channel, that quickly and accurately generates a track identification signal and a position error signal while using minimal circuitry. This eliminates the need for peak detection circuitry and allows for an increase in overall HDD capacity, lower power consumption, and improved overall HDD performance.

According to the present invention, a servo demodulator is provided for generating a track identification signal and a position error signal from a servo wedge during a servo operation. The servo demodulator interfaces with a synchronously sampled read channel to generate these signals. The servo demodulator includes a servo clock generation circuit, a position error signal circuit, and a track identification circuit. The servo clock generation circuit generates a synchronous servo clock signal in response to receiving a reference clock signal and the servo wedge signal. The servo clock signal is provided to the read channel for use in processing the servo wedge signal. The position error signal circuit generates a position error signal in response to receiving the synchronous servo clock signal from the servo clock generation circuit and a synchronously sampled servo wedge signal from the read channel. Finally, the track identification circuit generates a track identification signal in response to receiving a digital servo wedge signal from the read channel.

The present invention provides various technical advantages over using peak detection circuitry to assist with processing the servo wedge. A technical advantage of the present invention includes the ability to quickly and accurately generate a track identification signal and a PES so that overall HDD storage capacity may be increased. Overall HDD storage capacity is increased by reducing the amount of storage capacity dedicated to providing the servo wedge. Another technical advantage of the present invention includes reduced overall power consumption. Reduced overall power consumption results from a reduction in overall circuitry because of the elimination of peak detection circuitry. Yet another technical advantage includes increased accuracy in generating track identification signals and PESs thus reducing track rereads and improving overall HDD performance. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
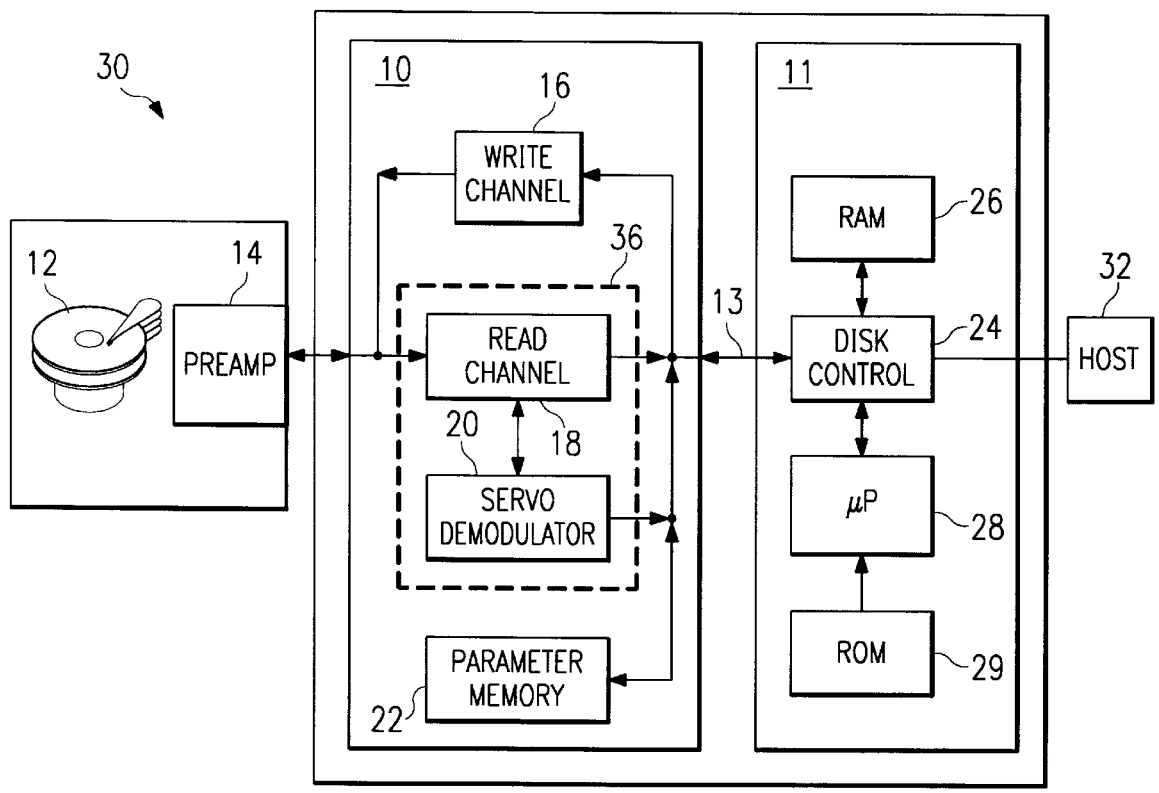
FIG. 1 is a block diagram illustrating a disk drive mass storage system.

FIG. 1 is a block diagram of a disk drive mass storage system 30 used for retrieving data during read operations and for storing data during write operations. Disk drive mass storage system 30 interfaces and exchanges data with a host 32 during read and write operations and includes a disk/head assembly 12, a preamplifier 14, a synchronously sampled data (SSD) channel 10, and a control circuitry 11. Disk/head assembly 12 and preamplifier 14 are used to magnetically store data. SSD channel 10 and control circuitry 11 are used to process data that is being read from or written to disk/head assembly 12 and to control the various operations of disk drive mass storage system 30. Host 32 exchanges digital data with control circuitry 11.

Disk/head assembly 12 includes a number of rotating magnetic disks or platters used to store data. The data are stored as magnetic transitions on the magnetic platters. The read/write heads are used to store and retrieve data from each side of the magnetic platters. The data are provided in the form of read and write data signals. The read/write heads may be any number of available read/write heads such as magneto-resistive heads. Preamplifier 14 interfaces between the read/write heads and SSD channel 10 and provides amplification to the read and write data signals as needed.

SSD channel 10 is used during read and write operations to exchange analog data signals with disk/head assembly 12 through preamplifier 14 and to exchange digital data signals with control circuitry 11 through a data/parameter path 13. SSD channel 10 includes a write channel 16, a read channel 18, a servo demodulator 20, and a parameter memory 22. SSD channel 10 may be implemented as a single integrated circuit. The phantom box surrounding read channel 18 and servo demodulator 20 illustrates the combination of read channel 18 and servo demodulator 20 and may be referred to as read channel/servo demodulator 36. Read channel/servo demodulator 36, illustrated more fully in FIG. 2, may also be implemented as a single integrated circuit.

Write channel 16 receives digital data from control circuitry 11 in parallel format through data/parameter path 13 during write operations. The digital data is reformatted for storage and provided to disk/head assembly 12. Write channel 16 may include a register, a scrambler, an encoder, a serializer, and a write precompensation circuit. The operation and timing of write channel 16 is controlled by a phase locked loop.

Read channel 18 receives analog data signals from disk/head assembly 12 through preamplifier 14 during read operations. Read channel 18 conditions, decodes, and formats the analog data signal and provides a digital data signal in parallel format to control circuitry 11 through data/parameter path 13. Read channel 18 includes any of a variety of circuit modules such as an automatic gain control circuit, a low pass filter, a sampler, an equalizer, such as a finite impulse response filter, and a maximum likelihood, partial response detector, such as a Viterbi detector. The timing and operation of read channel 18 is controlled by a phase locked loop.

The various circuit modules of SSD channel 10 may receive operational parameters for enhanced or optimal performance. The operational parameters are generally calculated during burn-in but may be calculated at other times. The operational parameters are used to enhance the operation of SSD channel 10. The operational parameters are also designed to account for the various physical and magnetic characteristics of disk drive mass storage system 30 that vary from system to system and influence operational performance. During start-up, the operational parameters are provided to SSD channel 10 from control circuitry 11 through data/parameter path 13. Parameter memory 22 stores the operational parameters. The various circuit modules of SSD channel 10 may then access the operational parameters from parameter memory 22.

Servo demodulator 20, in conjunction with read channel 18, generates track identification signals and position error signals (PES) and provides these signals to control circuitry 11 during read and write operations. These signals originate from servo wedges stored on the disks of disk/head assembly 12. The track identification signals identify the various tracks on the disks of disk/head assembly 12. The PES relate to the position of the read/write heads on individual tracks so that the heads can be properly positioned during both read and write operations.

Control circuitry 11 is used to control the various operations of disk drive mass storage system 30 and to exchange digital data with SSD channel 10 and host 32. Control circuitry 11 includes a microprocessor 28, a disk control circuit 24, a random access memory (RAM) 26, and a read only memory (ROM) 29. Microprocessor 28, disk control circuit 24, RAM 26, and ROM 29 together provide control and logic functions to disk drive mass storage system 30 so that data may be received from host 32, stored on disk/head assembly 12, and later retrieved from disk/head assembly 12 and provided back to host 32. ROM 29 stores preloaded microprocessor instructions for use by microprocessor 28 in operating and controlling disk drive mass storage system 30. ROM 29 may also store the operational parameters that are supplied to parameter memory 22 during start-up. RAM 26 is used to temporarily store digital data during read and write operations. Disk control circuit 24 includes various logic and bus arbitration circuitry used to interface disk drive mass storage system 30 to host 32 and for internally interfacing control circuitry 11 to SSD channel 10. Depending on the circuit implementation, any of a variety of circuitry may be used in disk control circuit 24.

Control circuitry 11 is also used to receive the track identification signals and PES from servo demodulator 20. Control circuitry 11 processes these signals and ensures that the read/write heads are properly positioned and aligned on disk/head assembly 12 so that data may be correctly read from and written to the disks of disk/head assembly 14.

In operation, disk drive mass storage system 30 goes through an initialization or start-up routine when power is initially provided. One such routine instructs microprocessor 28 to supply the operational parameters, previously stored in ROM 29, to parameter memory 22 through data/parameter path 13. The operational parameters are then stored in memory registers of parameter memory 22 for use by read channel 18 during a read operation and other circuit modules of SSD channel 10.

After the initialization routine is complete, data may be read from or written to disk/head assembly 12. Servo demodulator 20 provides the track identification signals and PES so that the read/write heads may be properly positioned and aligned on the disks to read and write data.

Figure 2:
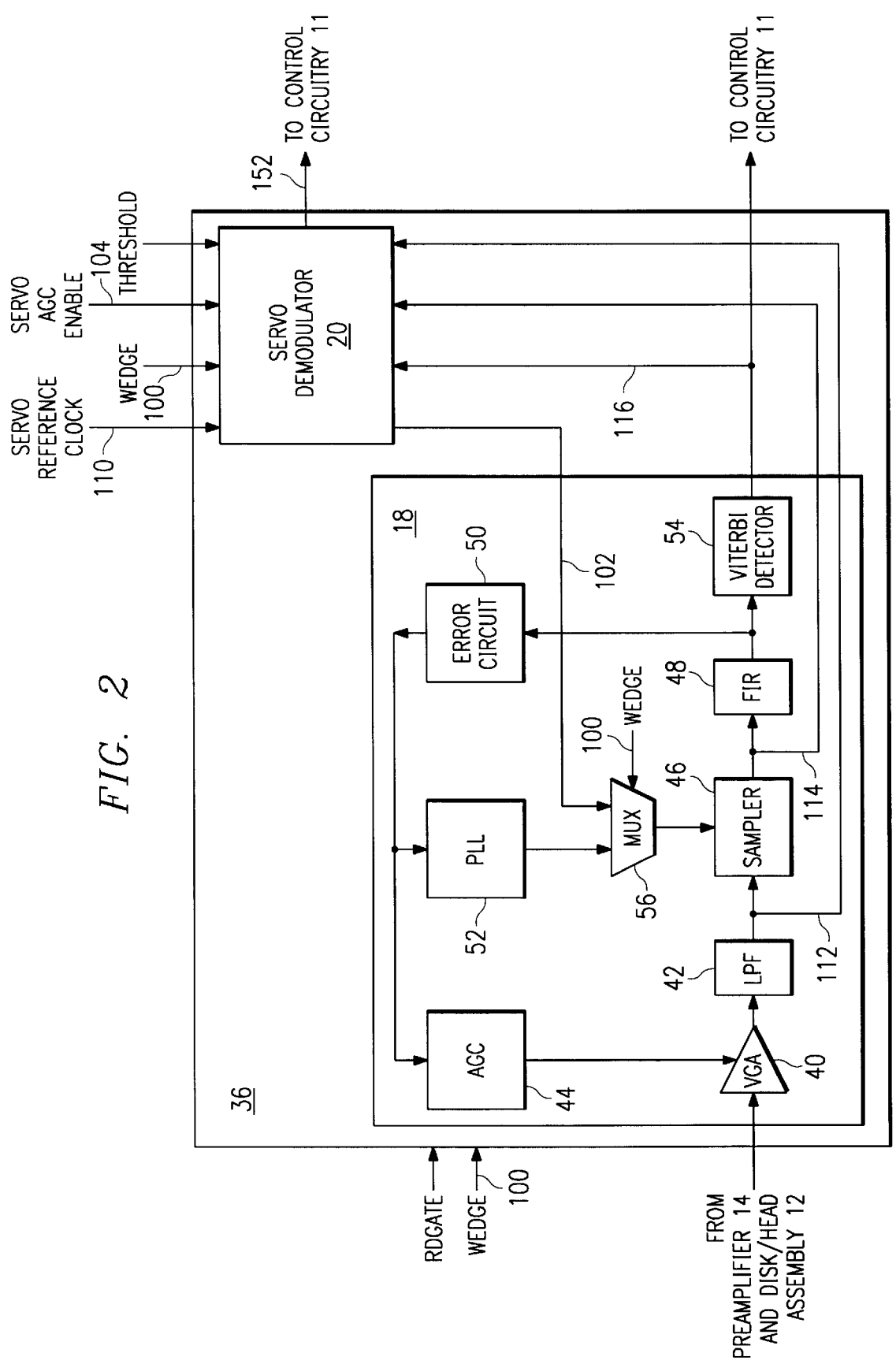
FIG. 2 is a block diagram illustrating a read channel and a servo demodulator of the disk drive mass storage system.

During a read operation, host 32 initiates a request for data. After the read/write heads of disk/head assembly 12 are properly positioned, an analog data signal is provided to preamplifier 14. Read channel 18 receives the analog data signal from preamplifier 14, processes the analog data signal, and provides a corresponding digital data signal. This may involve using various circuitry modules and techniques for synchronously sampling the analog data signal and detecting a digital signal as illustrated in FIG. 2 and discussed more fully below. Read channel 18 provides the digital data signal to disk control circuit 24 through data/parameter path 13. Disk control circuit 24 provides various digital logic control and arbitration circuitry between SSD channel 10, host 32, RAM 26, microprocessor 28, and ROM 29 during read, write, and servo operations. The digital data is then stored in RAM 26 until microprocessor 28 communicates to host 32 that the data is ready to be transferred. Host 32 may be a system bus such as the system bus of a personal computer.

During a write operation, a digital data signal is received from host 32 and ultimately stored on disk/head assembly 12. Digital data is initially provided from host 32 to control circuitry 11. Control circuitry 11 stores the digital data in RAM 26. Microprocessor 28 schedules a series of events so that the data may then be transferred from RAM 26 to disk/head assembly 12 through write channel 16. This data exchange occurs through data/parameter path 13. Write channel 16 encodes the digital data and places the data in serial format. Write channel 16 then provides the data to disk/head assembly 12 after the heads of disk/head assembly 12 have been properly positioned to write or store the data at an appropriate location on the disk.

FIG. 2 is a block diagram of read channel/servo demodulator 36 which is a combination of read channel 18 and servo demodulator 20. Read channel 18 is used to process and condition analog read signals during read operations and to process servo wedge signals received during servo operations. During a servo operation, servo demodulator 20 interfaces closely with read channel 18 so that the appropriate track identification signals and PES may be generated by servo demodulator 20. Thus, read channel/servo demodulator 36 may operate in a read mode during a read operation and a servo mode during a servo operation.

Read channel 18 is implemented, in the embodiment shown in FIG. 2, as a synchronously sampled read channel and is implemented as a partial response, class IV (PR4) or duobinary, dicode read channel. Read channel 18 includes a variety of circuit modules used to process and condition an analog read signal received from disk/head assembly 12 through preamplifier 14 during a read operation. The circuit modules of read channel 18 include a variable gain amplifier (VGA) 40, an automatic gain control circuit (AGC) 44, a low pass filter (LPF) 42, a sampler 46, a finite impulse response filter (FIR) 48, an error circuit 50, a phase locked loop 52, a sample clock multiplexer 56, and a viterbi detector 54. All of these circuit modules are used during a read operation to perform various functions to condition the analog read signal so that a corresponding and correct digital data signal is provided at the output of viterbi detector 54. The digital data signal may then be supplied to control circuitry 11, as shown in FIG. 1, and ultimately to a host system.

The RDGATE signal, a wedge enable signal 100, and other control signals, not shown in FIG. 2, are supplied to read channel 18 and may be accessed by the various circuit modules of read channel 18 as needed. Read channel/servo demodulator 36 operates in the read mode when the RDGATE signal is enabled and operates in the servo mode when wedge enable signal 100 is enabled.

During a servo operation, VGA 40 receives an analog servo wedge signal from preamplifier 14, that originates from a servo wedge stored on disk/head assembly 12, and amplifies the signal to generate an amplified analog servo wedge signal. VGA 40, along with AGC 44, work together to provide an appropriate amplification to the analog servo wedge signal as needed by read channel 18. AGC 44 receives feedback information from error circuit 50 so that appropriate adjustments can be made in the amplification or gain provided to the analog servo wedge signal by VGA 40. Error circuit 50 provides an analog error signal to AGC 44 during sampled or discrete time signal processing. This analog error signal serves as an input to AGC 44 to assist with establishing the gain of VGA 40.

VGA 40 provides the amplified analog servo wedge signal to LPF 42 for further processing in read channel 18. LPF 42 receives the amplified analog servo wedge signal and filters the signal to remove unwanted high frequency noise and generates a filtered servo wedge signal 112 during servo mode operation. LPF 42 also provides waveform shaping and amplitude boost. LPF 42 may be a continuous time 7th order filter designed using Gm/C components that may be operated in a read mode and a servo mode as determined by the RDGATE signal and wedge enable signal 100. The cutoff frequency and boost of LPF 42 may be programmable. Filtered servo wedge signal 112 is provided to sampler 46 and servo demodulator 20 as shown more fully in FIG. 3.

Sampler 46 receives filtered servo wedge signal 112 and synchronously samples the continuous time signal at discrete times and holds or provides the sampled value until the next sample time. PLL 52 controls sampler 46 during a read operation by providing a clock signal indicating when sampler 46 should sample and hold the signal. Servo demodulator 20, through a synchronous servo clock signal 102, controls the sampling of sampler 46 while in a servo mode. A sample clock multiplexer 56 provides synchronous servo clock signal 102 to sampler 46 when wedge enable signal 100 is enabled indicating that a servo operation is being performed. During servo operations the output of sampler 46 is a synchronously sampled servo wedge signal 114. Synchronously sampled servo wedge signal 114 has discrete values corresponding to the value or amplitude of filtered servo wedge signal 112 at the time the servo wedge signal 112 was sampled by sampler 46. Sampler 46 may be a sample and hold circuit such as a circular sample and hold circuit that is time sequence multiplexed to FIR 48 so that the correct time sequenced value is presented to FIR 48. Synchronously sampled servo wedge signal 114 is provided to FIR 48 and servo demodulator 20.

FIR 48 receives synchronously sampled servo wedge signal 114 from sampler 46 and generates a discrete, equalized signal that is equalized to the target function of viterbi detector 54. FIR 48 may employ a plurality of filter coefficients or taps to filter the signal. FIR 48 includes a plurality of multipliers that each receive one of the filter coefficients and a consecutive one of the discrete values provided from synchronously sampled servo wedge signal 114. The outputs of each of the multipliers are then provided to an adder, such as an analog adder circuit, which sums these values and serves as the output of FIR 48. As the discrete values of synchronously sampled servo wedge signal 114 changes, the consecutive one of the discrete values are shifted from one multiplier to the next multiplier so that the first multiplier receives the latest discrete value and the last multiplier drops the oldest discrete value and receives the next oldest discrete value.

FIR 48 may be a five tap filter with coefficients set by programmable digital circuitry. For example, FIR 48 may receive five digital coefficients or filter tap weights that are converted to an analog value through a digital-to-analog converter. Each coefficient is then provided to a separate multiplier. Each multiplier receives a successive one of the discrete values of synchronously sampled servo wedge signal 114. The outputs of all five of the multipliers are provided to an analog adder circuit which provides the discrete, equalized signal as the output of FIR 48. The number of coefficients or taps and corresponding multipliers may vary. FIR 48 provides the discrete, equalized signal to viterbi detector 54 and error circuit 50.

Error circuit 50 receives the discrete, equalized signal provided by FIR 48 and generates an analog error signal. The analog error signal serves as an input to PLL 52 and AGC 44. The analog error signal indicates how far the discrete values of the discrete, equalized signal differ from an ideal target value. Error circuit 50 may include comparators and storage registers to compare the discrete values of the discrete, equalized signal to various ideal target values and threshold values. The target values and threshold values, not shown in FIG. 2, are provided to error circuit 50.

PLL 52 receives the analog error signal from error circuit 50 during both read and servo operations and generates a clock signal. PLL 52 also receives a reference clock signal, not shown in FIG. 2, to generate the clock signal. The clock signal controls the sample time or sample intervals of sampler 46 during read operations and may serve as a timing signal to various circuitry of read channel 18. PLL 52 receives the error signal and adjusts the frequency of its output clock signal an amount corresponding to the error signal. Sample clock multiplexer 56 receives the clock signal and provides the clock signal to sampler 46 during a read operation.

Viterbi detector 54 is a maximum likelihood detector or viterbi decoder implementing the viterbi algorithm for analyzing the partial response signal provided by the discrete, equalized signal from FIR 48. Viterbi detector 54 generates a digital servo wedge signal 116 during servo mode operation. In performing maximum likelihood detection, the viterbi algorithm provides an iterative method for determining the best path along branches of a trellis diagram. The maximum likelihood detection involves analyzing a number of consecutive data samples to determine the most likely path. By analyzing a number of consecutive samples, the most likely sequence can be chosen. Viterbi detector 54 includes a metric circuit and a trellis block containing an even and odd trellis circuit.

As discussed above, read channel 18 is a synchronously sampled read channel that is implemented as a partial response, class IV (PR4) or duobinary, dicode read channel. In a PR4 read channel, the discrete, equalized signal, provided by FIR 48, is deinterleaved into an even and an odd interleave signal. The even and odd interleave signal are generated by alternately providing each discrete value of the discrete, equalized signal so that the odd interleave signal includes every other discrete value and the even interleave signal includes the remaining discrete values. Each interleave signal is analyzed separately by viterbi detector 54 and then interleaved or recombined into one digital data output signal.

The metric circuit alternately analyzes the even interleave signal and the odd interleave signal and provides a two-bit transition signal in response. The transition signal includes a negative transition signal and a positive transition signal.

The transition signal alternately provides a transition signal for the odd interleave signal and then for the even interleave signal. The trellis block includes an even trellis circuit and an odd trellis circuit that each receive the corresponding transition signal from the metric circuit. The odd and even trellis circuits act as logic trees or decision trees for sequence decoding of the transition signal. The digital output signals of the odd and even trellis circuits are interleaved or recombined to produce one digital data output signal which serves as digital servo wedge signal 116 during a servo operation.

In operation during a servo operation, read channel 18 receives an analog servo wedge signal from disk/head assembly 12 when wedge enable signal 100 is enabled. VGA 40 receives the analog servo wedge signal and provides appropriate gain or amplification and provides the signal to LPF 42. AGC 44 provides a gain signal to VGA 40 to establish the appropriate amplification or gain. AGC 44 receives feedback information from error circuit 50 so that appropriate adjustments can be made in the gain signal provided to VGA 40. LPF 42 filters the analog servo wedge signal and generates filtered servo wedge signal 112.

Sampler 46, under the control of PLL 52, receives filtered servo wedge signal 112 from LPF 42 and synchronously samples this signal. Sampler 46 generates synchronously sampled servo wedge signal 114 in response. FIR 48 receives synchronously sampled servo wedge signal 114 and further conditions and equalizes the signal and generates a discrete, equalized signal having the desired channel response of read channel 18. Viterbi detector 54 receives the discrete, equalized signal and analyzes the signal and generates digital servo wedge signal 116 that is provided to servo demodulator 20 during a servo operation.

Servo demodulator 20 receives a servo reference clock 110, wedge enable signal 100, servo AGC enable signal 104, a threshold signal, and various signals from read channel 18 such as filtered servo wedge signal 112, synchronously sampled servo wedge signal 114, and digital servo wedge signal 116 and uses these signals to generate synchronous servo clock signal 102 and servo demodulator output signal 152 during a servo operation. Servo demodulator output signal 152 provides a track identification signal 148 during a track identification time period and a PES 150 during a PES time period. These signals are provided to control circuitry 11 so that the read/write heads may be properly positioned and aligned during read and write operations. Thus, servo demodulator 20 uses read channel 18, under the control of synchronous servo clock signal 102, to generate filtered servo wedge signal 112, synchronously sampled servo wedge signal 114, and digital servo wedge signal 116 so that servo demodulator output signal 152 may be generated during a servo operation. FIGS. 3, 4, 5, and 6 further illustrate the operation of servo demodulator 20.

Figure 3:
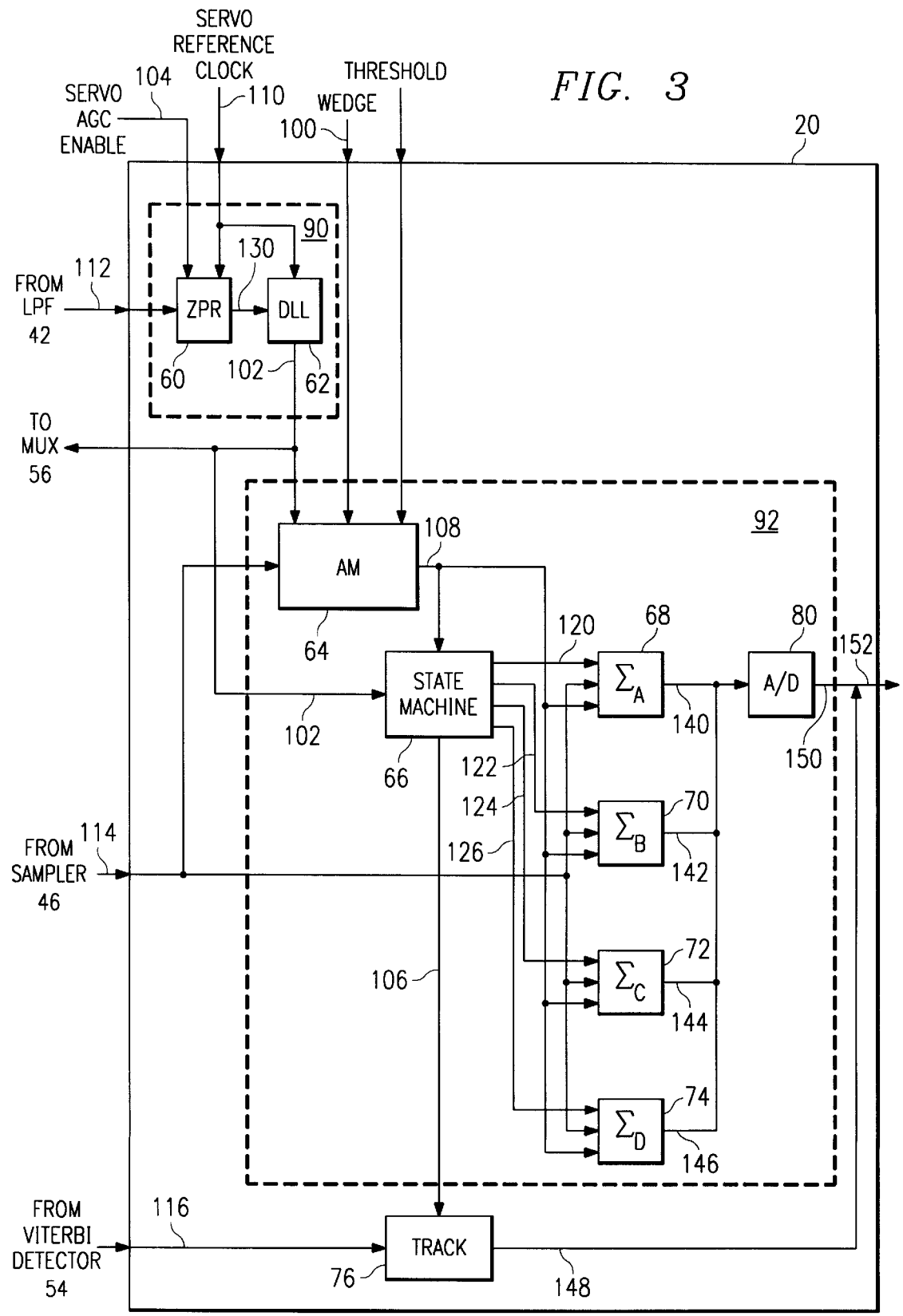
FIG. 3 is a block diagram illustrating the servo demodulator in more detail.

FIG. 3 is a block diagram of servo demodulator 20. Servo demodulator 20 is used in conjunction with read channel 18 to generate servo demodulator output-signal 152 that includes track identification signal 148 and position error signal 150. Servo demodulator 20 may be organized into three areas of operation identified as a servo clock generation circuit 90, illustrated with dotted lines, a position error signal circuit 92, also illustrated with dotted lines, and a track identification circuit 76.

Figure 5:
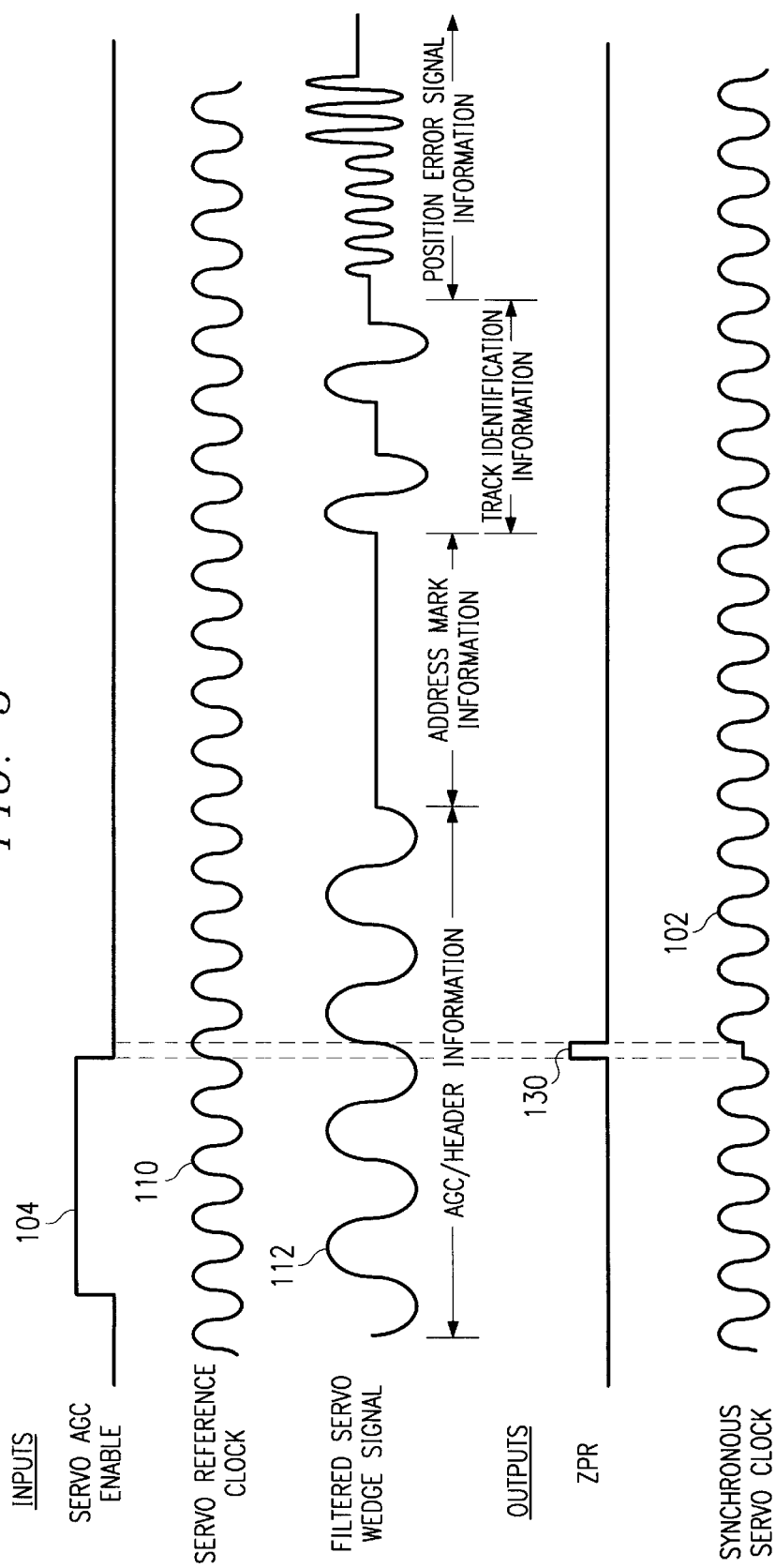
FIG. 5 is a timing diagram illustrating the signals of a servo clock generation circuit of the servo demodulator.

Servo clock generation circuit 90 receives filtered servo wedge signal 112 from read channel 18, a servo AGC enable signal 104, a servo reference clock signal 110, and generates synchronous servo clock signal 102 in response. Servo clock generation circuit 90 generates synchronous servo clock signal 102 so that the phase difference between synchronous servo clock signal 102 and filtered servo wedge signal 112 is minimized. Servo reference clock signal 110 and synchronous servo clock signal 102 generally have a frequency greater than that of filtered servo wedge signal 112. For example, filtered servo wedge signal 112 may be generated having a frequency of around ten megahertz while servo reference clock 110 and synchronous servo clock signal 102 may be provided at a frequency of around forty megahertz. Synchronous servo clock signal 102 is provided, as shown in FIG. 2, to sample clock multiplexer 56 and then to sampler 46 so that filtered servo wedge signal 112 may be synchronously sampled to generate synchronously sampled servo wedge signal 114. Servo clock generation circuit 90 includes zero phase restart circuit 60 and delay lock loop 62. The timing of the various signals of servo clock generation circuit 90 are illustrated in FIG. 5.

Zero phase restart circuit 60 receives filtered servo wedge signal 112, servo AGC enable signal 104, servo reference clock signal 110, and generates zero phase restart signal 130 in response. Zero phase restart circuit 60 compares filtered servo wedge signal 112 and servo reference clock signal 110, using a comparator, after servo AGC enable signal 104 transitions from an enabled state to an unenabled state, as illustrated in FIG. 5. Servo AGC enable signal 104 is provided in an enabled state during the time in which a servo wedge signal, such as the analog servo wedge signal discussed with respect to FIG. 2, provides AGC information to read channel 18 during a servo operation. After AGC enable signal 104 transitions from an enabled state to an unenabled state, servo reference clock signal 110 and filtered servo wedge signal 112 are compared and zero phase restart signal 130 is generated. Zero phase restart signal 130, as shown in FIG. 5, is provided in an enabled state for a period of time corresponding to the phase difference between servo reference clock signal 110 and filtered servo wedge signal 112.

Delay lock loop 62 receives zero phase restart signal 130 from zero phase restart circuit 60 along with servo reference clock signal 110 and generates synchronous servo clock signal 102 in response. Delay lock loop 62 adjusts the phase of servo reference clock signal 110 by an amount determined by zero phase restart signal 130 so that synchronous servo clock signal 102 is provided in phase with filtered servo wedge signal 112 and at a frequency equivalent to that of servo reference clock signal 110.

Delay lock loop 62 includes a plurality of delay blocks, such as a string of buffers or inverters, that are used to delay the phase of servo reference clock signal 110 by an amount indicated by zero phase restart signal 130. Delay lock loop 62 may be implemented using a string of buffers and a multiplexer that is used to receive a signal to select the number of buffers needed so that servo reference clock signal 110 will be delayed in an amount equal to the time in which zero phase restart signal 130 is provided in an enabled state. Synchronous servo clock signal 102 is provided to address mark circuit 64 of position error signal circuit 92 and to sample clock multiplexer 56 of read channel 18 as discussed above.

Position error signal circuit 92 is used to generate a track enable signal 106 and a position error signal 150 in response to receiving synchronously sampled servo wedge signal 114 from read channel 18. Position error signal circuit 92 includes address mark circuit 64, a state machine 66, a first adder circuit 68, such as an analog adder circuit, a second adder circuit 70, a third adder circuit 72, a fourth adder circuit 74, and an analog-to-digital converter 80.

Figure 4:
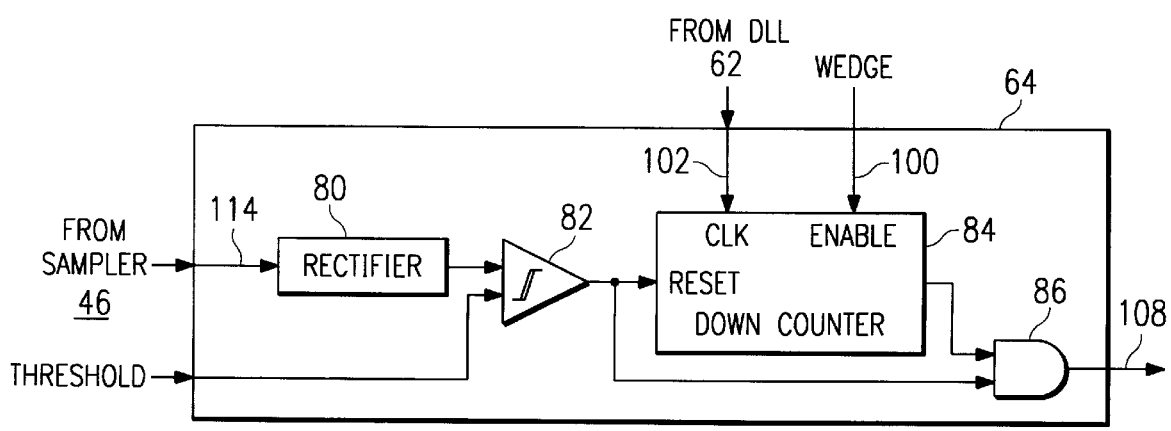
FIG. 4 is a block diagram illustrating an address mark circuit of a position error signal circuit of the servo demodulator.

Address mark circuit 64 receives synchronous servo clock signal 102 from servo clock generation circuit 90, wedge enable signal 100, a threshold signal, and synchronously sampled servo wedge signal 114 from read channel 18. Synchronously sampled servo wedge signal 114 has previously been sampled by sampler 46 under the control of synchronous servo clock signal 102. Address mark circuit 64 processes synchronously sampled servo wedge signal 114 and generates address mark enable signal 108 in an enabled state after synchronously sampled servo wedge signal 114 provides address mark information. The details of address mark circuit 64 are shown in FIG. 4 and discussed more fully below.

Figure 6:
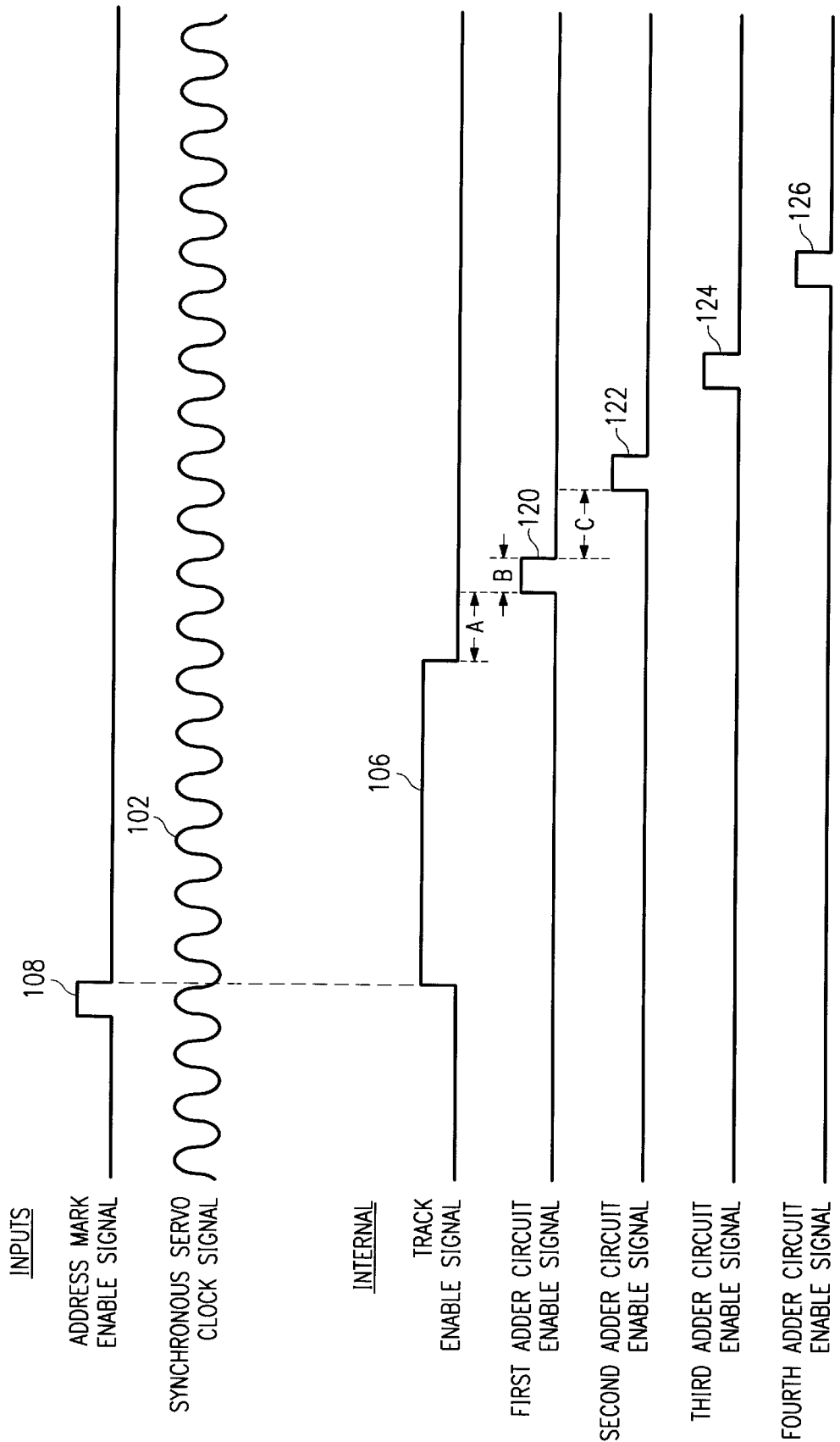
FIG. 6 is a timing diagram illustrating various input signals and internal signals of position error signal circuit.

Address mark enable signal 108 is provided to state machine 66 and the various adder circuits as shown. State machine 66 receives synchronous servo clock signal 102 along with address mark enable signal 108 and generates various signals used to enable other circuitry of servo demodulator 20. For example, state machine 66 generates track enable signal 106 in an enabled state during the time in which synchronously sampled servo wedge signal 116 provides track identification information, as shown in FIG. 5 and FIG. 6.

State machine 66 includes various timers or counters, such as programmable timers, that are used to generate the various output signals including track enable signal 106, a first adder circuit enable signal 120, a second adder circuit enable signal 122, a third adder circuit enable signal 124, and a fourth adder circuit enable signal 126. State machine 66 uses synchronous servo clock signal 102 as a clock to operate the various timers and counters of state machine 66. FIG. 6, described more fully below, illustrates the output signals generated by state machine 66 and their relative timing. Although not shown in FIG. 3, state machine 66 may receive various programmable control signals which determine the length of time each of the output signals of state machine 66 are enabled and when such signals are enabled.

Before finishing the description of position error signal circuit 92, track identification circuit 76 is described next. Track identification circuit 76 receives digital servo wedge signal 116 from read channel 18, track enable signal 106, and generates track identification signal 148 as an output. The operation of track identification circuit 76 is controlled by track enable signal 106 as provided by state machine 66. Track identification circuit 76 may be implemented as a shift register that receives digital servo wedge signal 116 and provides a corresponding digital signal as track identification signal 148 during the period in which track enable signal 106 is provided in an enabled state. The period of time when track enable signal 106 is provided in an enabled state corresponds to the period of time when synchronously sampled servo wedge signal 114 or filtered servo wedge signal 112 provides track identification information as illustrated in FIG. 5. Track identification signal 148 serves as servo demodulator output signal 152 during the time in which track identification information is provided by the servo wedge.

Returning now to the description of position error signal circuit 92, state machine 66 generates first adder circuit enable signal 120 during a first period of time in which position error signal information is being provided by the servo wedge. First adder circuit 68, second adder circuit 70, third adder circuit 72, and fourth adder circuit 74 are all adder circuits, such as an analog adder circuit. Each of these adder circuits is reset when address mark enable signal 108 is provided from address mark circuit 64 in an enabled state.

First adder circuit 68 receives first adder circuit enable signal 120 from state machine 66 and synchronously sampled servo wedge signal 114. First adder circuit enable signal 120 is provided in an enabled state during a first period in which position error signal information is being provided by the servo wedge through synchronously sampled servo wedge signal 114. During this period, first adder circuit 68 generates a first signal 140 by providing synchronously sampled servo wedge signal 114 to an analog adder or summer circuit. First signal 140 is then provided to analog-to-digital converter 80. Analog-to-digital converter 80 converts first signal 140 from the analog domain to the digital domain and provides position error signal 150 which serves as servo demodulator output signal 152 during this first period.

Second adder circuit 70, third adder circuit 72, and fourth adder circuit 74 operate in the same manner as first adder circuit 68 except that their corresponding adder circuit enable signals, provided from state machine 66, occur at later periods when position error signal information is provided from the servo wedge through synchronously sampled servo wedge signal 114. The operation and timing of these adder circuits is illustrated more fully with respect to FIGS. 5 and 6. Second adder circuit 70 generates second signal 142 which is converted by analog-to-digital converter 80 during a second period in which position error signal information is provided. Third adder circuit 72 generates third signal 144 during a third period in which position error signal information is provided, and finally, fourth adder circuit 74 generates fourth signal 146 during a fourth period in which position error signal information is provided. Second signal 142, third signal 144, and fourth signal 146 are each provided to analog-to-digital converter 80 during their respective time periods. The corresponding output of analog-to-digital converter 80 is position error signal 150 which serves as servo demodulator output signal 152 during these times. The first, second, third, and fourth period in which position error signal information is provided may correspond to servo burst signals that are provided by the servo wedge signal.

FIG. 4 is a block diagram illustrating address mark circuit 64 in more detail. Address mark circuit 64 receives synchronously sampled servo wedge signal 114, the threshold signal, synchronous servo clock signal 102, wedge enable signal 100, and generates address mark enable signal 108 in response. The transition of address mark enable signal 108 from an enabled state to an unenabled state indicates that address mark information has been provided by synchronously sampled servo wedge signal 114 and that track identification information will be provided next.

Address mark circuit 64 includes a rectifier circuit 80 for rectifying synchronously sampled servo wedge signal 114 and providing the rectified signal as an input to a comparator 82. Comparator 82 also receives the threshold signal, such as a programmable threshold signal, and compares these two input signals. Whenever the output of rectifier circuit 80 exceeds the threshold signal, comparator 82 generates an output signal in an enabled state. Thus, as illustrated in the timing diagrams of FIG. 5, during the period in which address mark information is provided, the threshold signal should exceed the output of rectifier circuit 80 and the output of comparator 82 will transition from an enabled state to an unenabled state and will be provided in an unenabled state during this period. The output of comparator 82 is provided to a down counter 84 and an AND gate 86.

Down counter 84 is a counter that is enabled during the period of time in which wedge enable signal 100 is provided in an enabled state. Down counter 84 begins counting down from a programmable initial value once the output of comparator 82 is provided in an enabled state. Down counter 84 counts down from the programmable initial value each clock cycle or a multiple of each clock cycle of synchronous servo clock signal 102. Down counter 84 is reset each time the output of comparator 82 transitions from an unenabled state to an enabled state.

Whenever down counter 84 counts from the initial value to zero, down counter 84 provides its output signal to AND gate 86 in an enabled state. During the time in which address mark information is provided, the output of comparator 82 is provided in an unenabled state thus allowing down counter 84 to count from the initial value down to zero. At such time, down counter 84 provides its output signal to AND gate 86 in an enabled state. Down counter 84 may maintain its output signal in an enabled state for a fixed period of time, such as a few clock cycles. The output of comparator 82 is provided to AND gate 86 in an enabled state whenever track identification information, as shown in FIG. 5, is provided by the servo wedge signal as reflected in synchronously sampled wedge signal 114. At such time, the output of rectifier circuit 80 will exceed the threshold value which results in comparator 82 providing an output signal in an enabled state. At such time, the two input signals provided to AND gate 86 are in an enabled state and the output of AND gate 86 is generated in an enabled state. The output of AND gate 86 serves as address mark enable signal 108 as illustrated in FIG. 6. As a consequence of the output of comparator 82 being enabled, down counter 84 is reset and the output of down counter 84 is eventually reset to an unenabled state.

FIG. 5 is a timing diagram illustrating the signals of servo clock generation circuit 90 of servo demodulator 20. As discussed above, servo clock generation circuit 90 receives filtered servo wedge signal 112 from LPF 42 of read channel 18, servo AGC enable signal 104, servo reference clock signal 110, and ultimately generates synchronous servo clock signal 102 in response.

Servo AGC enable signal 104 is shown provided in an enabled state during the time in which "header" information or AGC information is provided by the servo wedge through filtered servo wedge signal 112. During this time, AGC 44 of read channel 18, as shown in FIG. 2, is used to establish a gain signal that is provided to VGA 40 for properly amplifying the analog servo wedge signal. After AGC enable signal 104 transitions from an enabled state to an unenabled state, zero phase restart circuit 60, using comparator circuitry, generates zero phase restart signal 130 by comparing servo reference clock signal 110 to filtered servo wedge signal 112. Zero phase restart signal 130 corresponds to the phase difference between servo reference clock signal 110 and filtered servo wedge signal 112. Zero phase restart signal 130 is provided in an enabled state for the period of time in which servo reference clock signal 110 and filtered servo wedge signal 112 are out of phase.

Zero phase restart signal 130 is provided as an input to delay lock loop 62 along with servo reference clock signal 110. Delay lock loop 62 delays servo reference clock signal 110 an amount equivalent to zero phase restart signal 130 to generate synchronous servo clock signal 102 that is in phase with filtered servo wedge signal 112.

FIG. 6 is a timing diagram illustrating various input signals and internal signals used in position error signal circuit 92 of servo demodulator 20. Synchronous servo clock signal 102 is provided as one of several inputs to address mark circuit 64, as illustrated in FIG. 3. Address mark circuit 64 generates address mark enable signal 108 in response. Address mark enable signal 108 and synchronous servo clock signal 102 are provided as inputs to state machine 66. As mentioned above, state machine 66 includes various timer or counter circuits that may be programmed through external ports. State machine 66 provides various enabling signals to the remaining circuitry of position error signal circuit 92 and track identification circuit 76 so that servo demodulator output signal 152 may be generated and ultimately provided to control circuitry 11 as shown in FIGS. 1 and 2.

Filtered servo wedge signal 112, as shown in FIG. 5, provides track identification information after address mark information has been provided. This is signaled when address mark enable signal 108 transitions from an enabled state to an unenabled state. State machine 66 generates and provides track enable signal 106 in an enabled state when track identification information is provided. During the time in which track enable signal 106 is provided in an enabled state, track identification circuit 76 provides digital servo wedge signal 116, using a shift register, as track identification signal 148 which serves as servo demodulator output signal 152 during this time.

During the time in which the servo wedge signal, such as synchronously sampled servo wedge signal 114, provides position error signal information, state machine 66 provides four enabling signals that correspond to four servo burst signals provided by the servo wedge signal. For example, state machine 66 provides first adder circuit enable signal 120 in an enabled state for a period of time in which a first servo burst is provided by the servo wedge signal. Second adder circuit enable signal 122, third adder circuit enable signal 124, and fourth adder circuit enable signal 126 are provided in an enabled state during successive periods of time in which the servo wedge signal provides additional servo burst signals during the time in which position error signal information is being provided.

The period of time that these adder circuit enable signals are provided in an enabled state are programmable and may be varied. Additionally, the period of time, indicated by the letter "A" in FIG. 6, between when track enable signal 106 transitions from an enabled state to an unenabled state and when first adder circuit enable signal 120 is provided in an enabled state is also programmable. The letter "B" represents the period of time when first adder circuit enable signal 120 is provided in an enabled state. This is shown in FIG. 6 to indicate that this period of time is also programmable. Likewise, the letter "C," which designates the period of time between when first adder circuit enable signal 120 transitions from an enabled state to an unenabled state and when second adder circuit enable signal 122 transitions from an unenabled state to an enabled state, is also a programmable period. Any of the signals generated by state machine 66 may be provided in an enabled state for a programmable period of time.

Thus, it is apparent that there has been provided, in accordance with the present invention, a servo demodulator and method for synchronous servo demodulation to quickly and accurately generate a track identification signal and a position error signal that satisfies the advantages set forth above. Although the preferred embodiment has been described in detail, it should be understood that various changes, substitutions, and alterations can be made herein without departing from the scope of the present invention. For example, a variety of different circuitry, such as digital circuitry, may be provided in place of first adder circuit 68, second adder circuit 70, third adder circuit 72, fourth adder circuit 74, and analog-to-digital converter 80. Also, the circuits described and illustrated in the preferred embodiment as discrete or separate circuits, such as address mark circuit 64, may be combined into one circuit or split into separate circuits without departing from the scope of the present invention. The servo wedge may provide information, such as track identification information and position error signal information, in any order. Many of the signals provided to servo demodulator 20 may be programmable signals. Furthermore, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention.

What is claimed is:

1. A servo demodulator for generating a track identification signal and a position error signal in response to the processing and generation of a digital servo wedge signal by a synchronously sampled read channel, the servo demodulator comprising:

a servo clock generation circuit operable to generate a synchronous servo clock signal in response to receiving a reference clock signal and the servo wedge signal, the servo clock signal provided to the read channel for processing of the servo wedge signal;

a position error signal circuit operable to generate a position error signal in response to receiving the synchronous servo clock signal of the servo clock generation circuit and a synchronously sampled servo wedge signal from the read channel; and a track identification circuit operable to generate a track identification signal in response to receiving a digital servo wedge signal from the read channel.

2. The servo demodulator of claim 1, wherein the synchronously sampled servo wedge signal is generated in the read channel by synchronously sampling the servo wedge signal using the synchronous servo clock signal.

3. The servo demodulator of claim 2, wherein the digital servo wedge signal is generated in the read channel by synchronously sampling the servo wedge signal using the synchronous servo clock signal and performing maximum likelihood detection on the synchronously sampled servo wedge signal.

4. The servo demodulator of claim 2, wherein the servo wedge signal includes an address mark portion, a track identification portion, and a position error portion.

5. The servo demodulator of claim 4, wherein the position error signal circuit includes an address mark circuit operable to receive and process the synchronously sampled servo wedge signal and to enable an address mark enable signal indicating that the address mark portion of the servo wedge signal has been provided.

6. The servo demodulator of claim 2, wherein the servo wedge signal includes a position error portion and the position error portion includes a plurality of position error bursts, and the position error circuit is operable to generate the position error signal when the synchronously sampled servo wedge signal provides the position error portion.

7. The servo demodulator of claim 1, wherein the servo clock generation circuit comprises:

a zero phase restart circuit operable to receive the reference clock signal and the servo wedge signal and to generate a zero phase restart signal having a duration equivalent to the phase difference between the reference clock signal and the servo wedge signal; and a delay lock loop circuit operable to receive the reference clock signal and the zero phase restart signal and to generate the synchronous servo clock signal by delaying the reference an amount equivalent to the zero phase restart signal.

8. The servo demodulator of claim 1, wherein the servo wedge signal includes a header portion and the servo clock generation circuit generates the synchronous servo clock signal when the servo wedge signal provides the header portion.

9. The servo demodulator of claim 1, wherein the track identification circuit is a shift register operable to receive the digital servo wedge signal during a period of time when the digital servo wedge signal provides track identification information.

10. A servo demodulator for generating a track identification signal and a position error signal in response to processing generation of a digital servo wedge signal by a synchronously sampled read channel, the servo demodulator comprising:

a servo clock generation circuit operable to generate a synchronous servo clock signal in response to receiving a reference clock signal and the servo wedge signal, the servo clock signal provided to the read channel for processing of the servo wedge signal;

a position error signal circuit operable to generate a position error signal in response to receiving the synchronous servo clock signal of the servo clock generation circuit and a synchronously sampled servo wedge signal from the read channel; and a track identification circuit operable to generate a track identification signal in response to receiving a digital servo wedge signal from the read channel, wherein the synchronously sampled servo wedge signal is generated in the read channel by synchronously sampling the servo wedge signal using the synchronous servo clock signal, wherein the servo wedge signal includes a position error portion and the position error portion includes a plurality of position error bursts, and the position error circuit is operable to generate the position error signal when the synchronously sampled servo wedge signal provides the position error portion, and wherein the position error signal circuit comprises:

a plurality of converting circuits for receiving and processing the plurality of position error bursts provided by the synchronously sampled servo wedge signal to generate the position error signal; and a state machine operable to receive the synchronous servo clock signal and to provide a plurality of enabling signals to enable each of the plurality of converting circuits to process a corresponding one of the plurality of position error bursts.

11. The servo demodulator of claim 10, wherein each one of the position error bursts, provided by the synchronously sampled servo wedge signal, include a number of samples, and wherein each one of the plurality of converting circuits comprise:

a summing circuit operable to sum the number of samples from one of the position error bursts and to generate an output in response; and an analog-to-digital converter operable to receive the output from the summing circuit and to generate a digital output signal that serves as the position error signal in response.

12. The servo demodulator of claim 10, wherein each one of the position error bursts, provided by the synchronously sampled servo wedge signal, include a number of samples, and wherein each one of the plurality of converting circuits comprise:

an analog-to-digital converter operable to receive the position error bursts in the analog domain and to convert the position error bursts to the digital domain; and a summing circuit operable to receive the number of samples from one of the position error bursts in the analog domain and to sum the number of samples to generate the position error signal.

13. A servo demodulator for generating a track identification signal and a position error signal in response to processing and generation of a digital servo wedge signal by a synchronously sampled read channel, the servo demodulator comprising:

a servo clock generation circuit operable to generate a synchronous servo clock signal in response to receiving a reference clock signal and the servo wedge signal, the servo clock signal provided to the read channel for processing of the servo wedge signal;

a position error signal circuit operable to generate a position error signal in response to receiving the synchronous servo clock signal of the servo clock generation circuit and a synchronously sampled servo wedge signal from the read channel; and a track identification circuit operable to generate a track identification signal in response to receiving a digital servo wedge signal from the read channel, wherein the synchronously sampled servo wedge signal is generated in the read channel by synchronously sampling the servo wedge signal using the synchronous servo clock signal, wherein the servo wedge signal includes an address mark portion, a track identification portion, and a position error portion, and wherein the position error signal circuit is further operable to generate a track enable signal indicating when the track identification portion of the servo wedge signal is being provided, and the track identification circuit is operable to generate a track identification signal in response to receiving the track enable signal and the digital servo wedge signal.

14. A servo demodulator for generating a track identification signal and a position error signal in response to processing and generation of a digital servo wedge signal by a synchronously sampled read channel, the servo demodulator comprising:

a servo clock generation circuit operable to generate a synchronous servo clock signal in response to receiving a reference clock signal and the servo wedge signal, the servo clock signal provided to the read channel for processing of the servo wedge signal;

a position error signal circuit operable to generate a position error signal in response to receiving the synchronous servo clock signal of the servo clock generation circuit and a synchronously sampled servo wedge signal from the read channel; and a track identification circuit operable to generate a track identification signal in response to receiving a digital servo wedge signal from the read channel, wherein the synchronously sampled servo wedge signal is generated in the read channel by synchronously sampling the servo wedge signal using the synchronous servo clock signal, wherein the servo wedge signal includes an address mark portion, a track identification portion, and a position error portion, wherein the position error signal circuit includes an address mark circuit operable to receive and process the synchronously sampled servo wedge signal and to enable an address mark enable signal indicating that the address mark portion of the servo wedge signal has been provided, and wherein the address mark circuit comprises:

a rectifier circuit operable to rectify the synchronously sampled servo wedge signal and to generate a rectified synchronously sampled servo wedge signal in response;

a comparator operable to compare the rectified synchronously sampled servo wedge signal and a threshold signal and to generate a comparison signal in response, the comparison signal indicating whether the rectified synchronously sampled servo wedge signal is larger than the threshold signal; and a timer operable to receive the comparison signal and to enable an address mark enable signal after receiving the comparison signal in a known state for a period of time.

15. The servo demodulator of claim 14, wherein the timer is a down counter that generates the address mark enable in an enabled state after receiving a number of consecutive comparison signal values indicating that the threshold signal is larger than the rectified synchronously sampled servo wedge signal.

16. A servo system for generating a track identification signal and a position error signal from a servo wedge signal, the servo system comprising:

a synchronously sampled read channel operable to receive the servo wedge signal and to generate a filtered servo wedge signal, the read channel further operable to receive a synchronous servo clock signal and the servo wedge signal and to generate a synchronously sampled servo wedge signal and a digital servo wedge signal in response;

a servo clock generation circuit operable to generate the synchronous servo clock signal in response to receiving a reference clock signal and the filtered servo wedge signal from the read channel;

a position error signal circuit operable to generate a position error signal in response to receiving the synchronous servo clock signal from the servo clock generation circuit and the synchronously sampled servo wedge signal from the read channel; and a track identification circuit operable to generate a track identification signal in response to receiving the digital servo wedge signal from the read channel.

17. The servo system of claim 16 wherein the synchronously sampled read channel is a partial response, maximum likelihood read channel using the synchronous servo clock signal to sample the servo wedge signal.

18. A method for synchronous servo demodulation of a servo wedge signal containing position error signal information and track identification information, the method comprising the steps of:

receiving a filtered servo wedge signal and a reference clock signal;

generating a synchronous servo clock signal in response;

providing the synchronous servo clock signal and the servo wedge signal to a read channel;

generating a synchronously sampled servo wedge signal and a digital servo wedge signal in the read channel;

receiving the synchronous servo clock signal and the synchronously sampled servo wedge signal;

generating a position error signal in response to said synchronous servo clock signal and the synchronously sampled servo wedge signal;

receiving the digital servo wedge signal; and generating a track identification signal in response to said digital servo wedge signal.

19. The method of claim 18, further comprising the step of generating an address mark enable signal in an enabled state indicating that track identification information will be provided through the digital servo wedge signal.

20. The method of claim 19, wherein the servo wedge signal includes an address mark portion, a track identification portion, and a position error portion.

* * * * *